Patented Mar. 21, 1933                                     1,902,576

UNITED STATES PATENT OFFICE

RAYMOND J. NORTON, OF WASHINGTON, DISTRICT OF COLUMBIA, ASSIGNOR TO BENDIX BRAKE COMPANY, OF SOUTH BEND, INDIANA, A CORPORATION OF ILLINOIS

FRICTION SURFACES

No Drawing.    Application filed May 29, 1930.   Serial No. 457,530.

This invention relates to friction surfaces and more particularly to a friction facing for brake members.

The friction material ordinarily employed in brake members is a woven asbestos which is strengthened by metal wires. Other types comprise a felted asbestos with which is incorporated a suitable bonding substance.

During the normal operation of such structures considerable heat is generated due to the frictional engagement of the friction surface with the rotating drum. At these high braking temperatures it has been found that grabbing of the drum is accentuated. This is an undesirable characteristic of brake operation. Any method of minimizing it would be advantageous.

An object of the present invention is to provide a friction facing in which the grabbing effect at high temperatures is automatically relieved.

Another object is to provide a friction facing having incorporated therein metallic materials which tend to minimize grabbing and insure smooth operation.

Yet another object is to provide a friction material in which is incorporated a specially chosen metallic substance which functions to lubricate the frictionally engaging surfaces at the potential grabbing temperatures.

With these and other equally important objects in view the invention comprehends the provision of a friction material in which is incorporated a metallic substance, such as an alloy, the melting point of which is in that temperature range in which grabbing of the brake is most likely. The invention also comprehends the utilization of a plurality of metallic materials having melting points of different magnitudes so that these materials may be successively fused. In operation of the device as the generated heats of friction reach that range at which grabbing is most likely to occur the metallic inclusions plasticize and/or liquefy so as to provide a lubricating medium and eliminate grabbing.

The frictional heats which are generated during braking, are largely a function of the speed of the vehicle, force with which the brake shoe is applied and the length of the brake application. The particular temperature at which grabbing is most likely to occur depends not only on the characteristics of the friction facing as originally made up but also on the character of the frictional engaging surfaces of the facing and drum at any given time. In order to insure an automatic grab release there is incorporated in the friction facing a metallic substance, preferably an alloy which plasticizes or melts within that temperature range at which grabbing occurs.

In order to insure elimination of grabbing a plurality of these materials having increasing melting points may be employed. In such circumstances one of the alloys may melt at a relatively low temperature thereby insuring a given lubricating effect; as the temperature increases and the likelihood of grabbing proportionately increases another of the alloys will melt and hence will increase or augment the lubricating effect of the first alloy.

It will be appreciated that in making up a friction facing the alloy which is included will be determined by the characteristics of the particular friction facing. For this reason a wide range of materials is contemplated. These are so chosen as to provide any desired melting point which, as noted, is within the temperature range at which the particular friction facing is most liable to grab. The following, indicating a series of alloys of gradually increasing melting points, will serve to illustrate these principles of selection.

| Alloy | Melting point degrees centigrade |
|---|---|
| 85 Pb—15 Sb | 230 |
| 90 Sn—10 Sb | 280 |
| 60 Pb—40 Sn | 395 |
| 80 Zn—20 Al | 475 |
| 60 Al—40 Cu | 540 |
| 60 Al—40 Zn | 580 |
| 90 Al—10 Mg | 608 |
| 97 Al—3 Cu | 640 |
| 90 Al—10 Si | 750 |
| 80 Al—20 Sb | 840 |
| 60 Al—40 Sb | 970 |

It will be seen from the foregoing table that if the grabbing characteristics of a particular friction facing is known a relatively low melting point alloy may be chosen and incorporated in this type of friction material so as to melt at the grabbing temperature and lubricate the frictional surface. By choosing two or more of these alloys the quantum of lubrication may be successively increased as the temperature is raised.

If desired also those metallic materials may be chosen which subserve other desirable functions in a friction facing. For example, some of the magnesium compounds which have a strong affinity for oxygen may be incorporated in the brake band to serve as deoxidizers.

These metallic inclusions may be embodied either as finely divided particles adjacent to the friction surface or distributed uniformly throughout the friction material or again, they may be incorporated as wires of any desired gauge. In the latter case they may be so positioned as to mechanically strengthen the friction facing.

It will be observed that by using a plurality of these materials a wide range of melting temperatures may be covered and hence the safety factor as to grabbing increased.

While a number of alloys have been mentioned it will be understood that these are given as merely indicative of the broad idea of the choice of a material having a melting point corresponding to that temperature at which grabbing is most likely to occur. Obviously other specific metallic materials which function in the same manner may be utilized.

I claim:

1. A friction facing comprising a bonded asbestos fiber having incorporated therein alloys of different melting points, and which alloys melt within the temperature ranges of normal braking.

2. A friction facing comprising a bonded fibrous material having incorporated therein wire composed of alloys of differential fusibility, the fusion points, of which alloys are within the temperature range normally encountered in braking whereby a progressive lubricant of the facing is achieved.

3. A friction facing comprising a bonded fibrous material having incorporated therein discrete particles of alloys of differential and graduated fusibility and which alloys are adapted to progressively fuse upon the predetermined increases in temperature encountered in brake operation.

4. A friction facing comprising a bonded fibrous material having incorporated therein a magnesium compound and discrete particles of alloys of differential and graduated fusibility and which alloys are adapted to progressively fuse upon the predetermined increases in temperature encountered in brake operation.

5. A friction facing comprising bonded asbestos fiber having incorporated therein a magnesium compound and alloys of different melting points which alloys melt within the temperature ranges of normal braking.

6. A friction facing comprising a bonded fibrous material of predetermined grab characteristics and having incorporated therein a plurality of alloys of differential melting points, each of which melting points are within the grab temperature range.

In testimony whereof I affix my signature.

RAYMOND J. NORTON.